United States Patent [19]

Dise

[11] Patent Number: 4,984,837

[45] Date of Patent: Jan. 15, 1991

[54] LOAD SUPPORT ASSEMBLY FOR PICKUP TRUCK

[76] Inventor: Houston J. Dise, 1111 W. El Camino, Ste. 109-299, Sunnyvale, Calif. 94087

[21] Appl. No.: 504,157

[22] Filed: Apr. 3, 1990

[51] Int. Cl.⁵ .............................................. B60D 3/00
[52] U.S. Cl. ............................................ 296/3; 224/30; 224/321
[58] Field of Search .................. 296/3, 10, 1.1, 190, 296/210; 224/310, 324, 309, 321

[56] References Cited

U.S. PATENT DOCUMENTS

| | | | |
|---|---|---|---|
| 2,615,667 | 10/1982 | Smith et al. | 224/324 |
| 2,733,039 | 1/1956 | Balogh | 248/503 |
| 3,594,035 | 7/1971 | Ferguson | 296/3 |
| 3,737,083 | 6/1973 | Lund | 224/310 |
| 4,398,763 | 8/1983 | Louw | 296/3 |
| 4,405,170 | 9/1983 | Raya | 296/10 |
| 4,527,827 | 7/1985 | Maniscalco et al. | 296/3 |
| 4,630,990 | 12/1986 | Whiting | 414/462 |
| 4,854,628 | 8/1989 | Halberg | 296/3 |
| 4,867,497 | 9/1989 | Jayne | 296/3 |

OTHER PUBLICATIONS

Aero Duct advertisement, "Sport Truck" Mar. 1990, p. 53.

*Primary Examiner*—Robert R. Song
*Attorney, Agent, or Firm*—Townsend and Townsend

[57] ABSTRACT

A load support assembly (2) for a pickup truck (6) includes side support 8 mounted to the sides (10) of the cab (14) and elongate load support (16), having a flat top surface (18), pivotally mounted at its ends (26) to the side supports. When not in use the load support is oriented in a generally horizontal position to minimize wind drag. When in use, the load support is pivoted rearwardly so the top surface of the load support is aligned with the angle of the load. Stiff elastomeric support stops (32) are mounted to the bottom (20) of the load support to rest against the top (34) of the cab during use. Lateral movement of the load on the load support may be limited by load stops (42) extending upwardly from the top surface of the load support. The load stops are preferably pivotally mounted to the load support to pivot between a first, stowed position, lying adjacent the top surface of the load support, and a second, use position extending upwardly from the top surface.

16 Claims, 2 Drawing Sheets

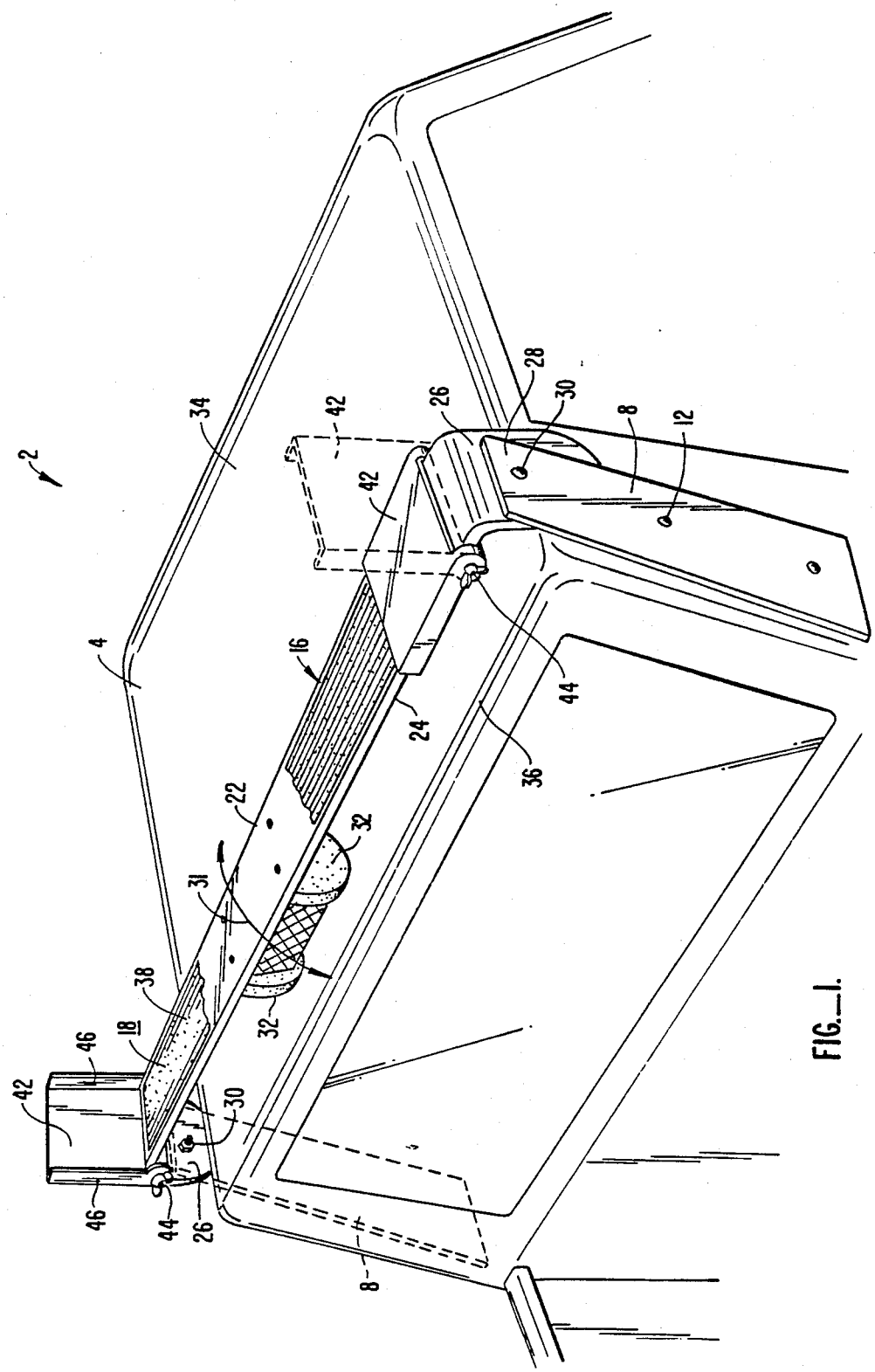
FIG._1.

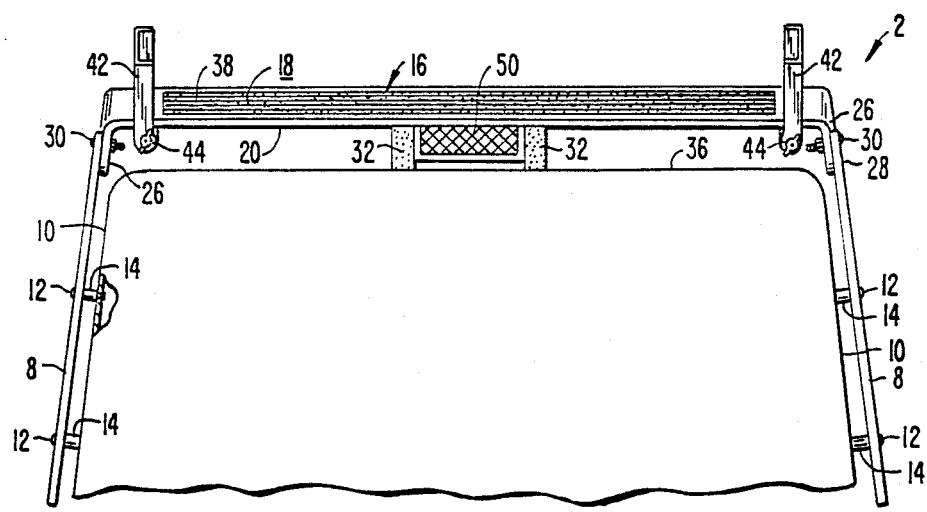
FIG._2.
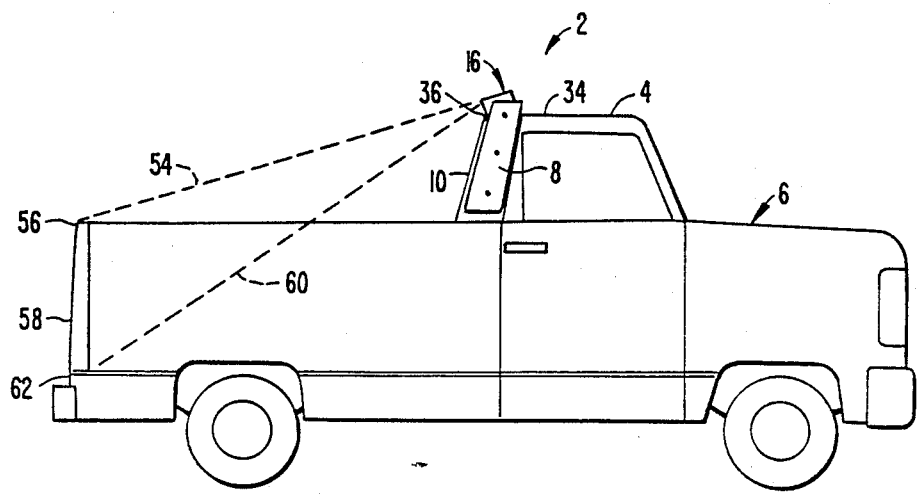
FIG._3.

LOAD SUPPORT ASSEMBLY FOR PICKUP TRUCK

BACKGROUND OF THE INVENTION

Pickup trucks are widely used by people in the construction industry. Very often the length of the load is longer than the length of the cargo space in the pickup truck. In such cases, the front end of the load is often positioned over the cab for transport. To protect the top of the cab from the load and to secure the load in place, various types of racks or carriers have been developed. The carriers are typically mounted to the four corners of the sidewalls of the cargo area of the pickup truck. Four corner posts extend upwardly from the corners with horizontal brace members extending between the posts. The uppermost brace member connecting the two forward corner posts is often used to support loads extending up over the cab. For example, see U.S. Pat. No. 4,405,170 entitled Demountable Carrier Rack Assembly for Pickup Truck, Issued to Ruben N. Raya on Sept. 20, 1983.

Although conventional racks are quite useful and have found widespread acceptance, they are not without shortcomings. Many are complex in structure, thus increasing their cost. They often create multiple obstructions in and around the cargo area, which hinder other uses of the truck. Also, they are generally rather unsightly—not aesthetically pleasing in design.

SUMMARY OF THE INVENTION

The present invention is directed to a load support assembly mounted to the cab of a pickup truck which is simple in construction, easy to use, sleek in design and minimizes wind resistance when not in use.

The load support assembly includes side supports mounted to the sides of the cab and an elongate load support. The load support has a generally flat top surface, a bottom and ends. The load support is typically pivotally mounted at its ends to the side supports for pivotal movement about a generally horizontal axis. When not in use the load support can be oriented in a generally horizontal position to minimize wind drag. When in use the load support may be pivoted rearwardly so the top surface of the load support is aligned with the angle of the load. Accordingly, the top surface of the load support is typically angled so that it is aligned generally with the top or bottom of the tailgate of the pickup truck.

At least one support stop, preferably of a stiff elastomeric material, is mounted to the bottom of the load support. The support stops are sized and positioned so that when the load support is in its in-use, angular orientation, at least part of the vertical load on the load support is supported by the cab through the support stops.

Lateral movement of the load on the load support may be limited by load stops extending upwardly from the top surface of the load support. The load stops are preferably pivotally mounted to the load support to the pivot between a first, stowed position, lying adjacent to the top surface of the load support, and a second, use position, extending upwardly from the top surface. Therefore, when the load stops are not needed, they can be pivoted out of the way to create little wind resistance and without interfering with the use of the load support assembly.

One of the primary advantages of the invention is that it provides an aesthetically pleasing but very functional load support assembly for use of a pickup truck. The use of flat surfaces provides the needed strength while minimizing wind resistance. The flat top surface of the load support provides an extended support surface for the load to minimize denting of the load, which can occur when the load rests against a round surface or corner. Even the load stops can be made to blend smoothly with the aerodynamic shape of the assembly when not in use. Further, since nothing extends into the cargo area of the truck, use of the truck is not affected. This is especially important in the area immediately behind a cab where tool boxes, spanning the entire width of the cargo area, are often carried.

The invention can be made from any different types of materials, including aluminum, steel and plastic. More than two load stops can be used to accommodate different width loads. Also, the load stops can be slidably mounted to the load support to allow the load stops to be moved to different positions along the load support. The load supports can be removably mounted to the load support as well.

Other features and advantages of the invention will appear from the following description in which the preferred embodiment has been set forth in detail in conjunction with the accompanying drawings.

BRIEF DESCRIPTION OF THE DRAWINGS

FIG. 1 is a perspective view showing a load support assembly mounted to the cab of a pickup truck;

FIG. 2 is a rear elevational view of the load support assembly of FIG. 1 with the load support tilted downwardly and rearwardly; and FIG. 3 is a simplified side elevational view of the load support assembly of FIG. 2 mounted to the cab of a pickup truck and illustrating two different angular orientations for the load support during use.

DETAILED DESCRIPTION OF THE PREFERRED EMBODIMENT

The figures illustrate a load support assembly 2 mounted to the cab 4 of a pickup truck 6. Assembly 2 includes a pair of side supports 8 secured to the sides 10 of cab 4 through the use of nut and bolts assemblies 12. Spacers 14 are positioned between side supports 8 and side 10 so that side supports 8 are spaced apart from the side.

Assembly 2 also includes a load support 16 having a top surface 18, a bottom 20, edges 22, 24 and ends 26. Ends 26 are bent downwardly so to lie adjacent the upper ends 28 of side supports 8. Ends 26 and upper ends 28 are secured together at pivots 30. The pivotal connections between load support 16 and side supports 8 permit the user to pivot load support 16 between a first, generally horizontal position, shown in FIG. 1 and a second, downwardly and rearwardly angled use position, shown in FIGS. 2 and 3.

The movement of load support 16 downwardly and rearwardly, that is in the direction of arrow 31 in FIG. 1, is halted by a pair of support stops 32 mounted to bottom 20 of load support 16. Support stops 32 are preferably a dense, stiff block of elastomeric material, such as rubber, configured to rest against the top 34 of cab 4 adjacent the rear, upper edge 36 of the cab. Support stops 32 both limit the downward and rearward pivotal movement of load support 16 and transfer a substantial portion of the vertical load on load support 16 to cab 4. This helps to reduce the load exerted on sides 10 of cab 4 through nut and bolt assemblies 12.

Top surface 18 of load support 16 includes a surface layer 38. Surface layer 38 is preferably a ribbed mat of rubber or rubber-like material to help keep the load from shifting on load support 16. Surface layer 38 could also be made to provide a smooth, low friction padded surface for the load as well, depending upon the requirements and desires of the user.

A pair of load stops 42 are pivotally mounted to load support 16. Load stops 42 are mounted by pivots 44 so to be pivotal between a first, stowed position, shown at the right side of FIG. 1, generally parallel to top surface 18, and a second, use position, shown at the left side of FIG. 1, extending upwardly from the top surface. Load stops 42 are configured so that when in the stowed position, the load stops are generally flush with top surface 18 and thus provide minimal drag or obstruction. Load stops 42 include a pair of legs 46 which lie adjacent edges 22, 24 when in the stowed position. Legs 46 add additional strength to load stops 42. Two load stops 42 are used in the disclosed embodiment, one at each end 26 of load support 16. If desired, additional load stops could be mounted along load support 16. Also, load stops 42 could be movably positioned along load support 16 to better accommodate different widths of loads.

Assembly 2 also includes a light 50 mounted to bottom 20 that is positioned between support stops 32. Light 50 may be hooked up as a tail light, a stop light, or both, depending upon the desires of the user. Other lights could, of course, also be used.

Support stops 32 are preferably sized and configured so that the angular orientation of top surface 18 is parallel to the load so that the load rests on the entire top surface rather than on an edge of load support 16. As illustrated in FIG. 3, the angular orientation of support stops 32 are preferably parallel to a line 54 connecting the top 56 of the tail gate 58 of truck 6 or is parallel to a line 60 connecting the bottom 62 of tail gate 58 with load support 16. In the preferred embodiment support stops 32 provide for a single angular orientation for top surface 18 during use.

Because of the resilient nature of support stops 32, minor adjustments to the basic angular orientation of load support 16 are automatically provided for. However, if desired, different basic angular orientations could be provided for, such as with use of shims positioned between support stops 32 and top 34 of cab 4. Also, support stops 32 could be removably mounted to bottom 20 so that different sized support stops could be used according to the angular inclination desired for top surface 18. Other methods for adjusting the final angular inclination of top surface could be used as well.

In use, the user mounts side supports 8 to sides 10 of cab 4 using nut and bolt assemblies 12 and spacers 14. Load support 16, including light 50, support stops 32 and load stops 42, is mounted to the upper ends 28 of side support 8 at pivots 30. When not in use, load stops 42 are pivoted downwardly to lie flush against top surface 18 and load support 16 is positioned generally horizontally. This both reduces wind drag and provides a pleasing, aesthetic appearance. To prepare for use, load support 16 is pivoted in the direction of arrow 31 to its downwardly and rearwardly angled use position of FIGS. 2 and 3. To minimize lateral movement of the load, load stops 42 may be raised. The load to be carried within pickup truck 6 has its forward end rested against top surface 18 of load support 16. The load may be lashed in place, as is conventional.

Modification and variation may be made to the disclosed embodiment without departing from the subject of the invention as defined by the following claims. For example, support stops 32 could be mounted to top 34 of cab 4 if desired.

What is claimed is:

1. A load support assembly for use with a pickup truck or the like having a cab, the cab having a top, sides and a back, the back and top meeting at a rear edge, the load support assembly comprising:

an elongate load support having ends, a generally flat top surface and a bottom;

side supports, mounted to the sides of the cab;

means for pivotally mounting the ends of the load support to the side supports for pivotal movement of the load support about a generally horizontal axis; and a support stop captured between the top of the cab and the bottom of the load support to stop rearward pivotal movement of the load support at a first angular orientation while providing vertical support for a load resting on the top surface.

2. The assembly of claim 1 wherein the bottom of the load support is generally flat.

3. The assembly of claim 1 further comprising a light mounted to the bottom of the load support.

4. The assembly of claim 1 wherein the support stop is secured to the bottom of the load support.

5. The assembly of claim 1 wherein the side supports are bolted to the sides of the cab.

6. The assembly of claim 1 wherein the support stop includes a block of an elastomeric material.

7. The assembly of claim 1 further comprising a rubberized layer at the top surface of the load support.

8. The assembly of claim 1 further comprising a load stop, mounted to the load support and extending upwardly from the top surface, for limiting lateral movement of a load supported by the top surface.

9. The assembly of claim 8 wherein the load stop is pivotally mounted to the load support for pivotal movement between a first, stowed position, lying adjacent to the top surface of the load support, and a second, use position, extending upwardly from the top surface.

10. The assembly of claim 9 wherein the load support has edges joining the top surface and the bottom and the load stop has a shallow U-cross-sectional shape with the legs of the U lying along said edges.

11. The assembly of claim 8 further comprising a plurality of said load stops.

12. A load support assembly for use with a pickup truck or the like having a cab, the cab having a top, sides and a back, the back and top meeting at a rear edge, the load support assembly comprising:

an elongate load support having ends, a generally flat top surface and a generally flat bottom;

side supports, mounted to the sides of the cab;

means for pivotally mounting the ends of the load support to the side supports for pivotal movement of the load support about a generally horizontal axis;

an elastomeric support stop mounted to the bottom of the load support to stop rearward pivotal movement of the load support at a first angular orientation while providing vertical support for a load resting on the top surface; and a plurality of load stops, mounted to the load support and extending upwardly from the top surface, for limiting lateral movement of a load supported by the top surface.

13. The assembly of claim 12 wherein the load stops are each pivotally mounted to the load support for pivotal movement between a first, stowed position, lying adjacent to the top surface of the load support, and a second, use position, extending upwardly from the top surface.

14. A load support assembly for use with a pickup truck or the like having a cab, the cab having a top, sides and a back, the back and top meeting at a rear edge, the load support assembly comprising:

an elongate load support having ends, a generally flat top surface and a bottom;

side supports, mounted to the sides of the cab;

means for pivotally mounting the ends of the load support to the side supports for pivotal movement of the load support in forward and rearward directions about a generally horizontal axis; and means for limiting the rearward pivotal movement of the load support at a first angular orientation while providing vertical support for a load resting on the top surface.

15. The assembly of claim 14 further comprising of a load stop, mounted to the load support and extending upwardly from the top surface, for limiting lateral movement of a load supported by the top surface.

16. The assembly of claim 15 wherein the load stop is pivotally mounted to the load support for pivotal movement between a first, stowed position, lying adjacent to the top surface of the load support, and a second, use position, extending upwardly from the top surface.

* * * * *